United States Patent
Ryu

(10) Patent No.: US 12,179,657 B2
(45) Date of Patent: Dec. 31, 2024

(54) LAMP DEVICE AND CONTROL METHOD THEREOF

(71) Applicant: HYUNDAI MOBIS CO., LTD., Seoul (KR)

(72) Inventor: Chang Myung Ryu, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 21 days.

(21) Appl. No.: 18/177,013

(22) Filed: Mar. 1, 2023

(65) Prior Publication Data
US 2024/0208403 A1   Jun. 27, 2024

(30) Foreign Application Priority Data
Dec. 22, 2022   (KR) .......................... 10-2022-0181950

(51) Int. Cl.
*B60Q 1/50*   (2006.01)
*B60Q 1/04*   (2006.01)

(52) U.S. Cl.
CPC ................ *B60Q 1/50* (2013.01); *B60Q 1/04* (2013.01); *B60Q 2300/32* (2013.01); *B60Q 2300/45* (2013.01); *B60Q 2400/50* (2013.01)

(58) Field of Classification Search
CPC .. G08B 13/1672; G06F 18/2113; G06F 18/00
See application file for complete search history.

(56) References Cited

U.S. PATENT DOCUMENTS

| | | | |
|---|---|---|---|
| 2014/0028980 A1* | 1/2014 | Othmer | G01C 21/365 353/14 |
| 2016/0221493 A1* | 8/2016 | Okamoto | B60Q 1/50 |
| 2017/0011269 A1* | 1/2017 | Yamaguchi | B60K 31/00 |

FOREIGN PATENT DOCUMENTS

| | | |
|---|---|---|
| DE | 10-2015-012021 | 3/2017 |
| DE | 10-2016-006391 | 11/2017 |
| EP | 2 689 966 | 1/2014 |

OTHER PUBLICATIONS

English Language Abstract of DE 10-2015-012021 published Mar. 23, 2017.
English Language Abstract of DE 10-2016-006391 published Nov. 30, 2017.
German Office Action dated Aug. 1, 2023 issued in DE 10 2013 107 827.5.

* cited by examiner

*Primary Examiner* — Omeed Alizada
(74) *Attorney, Agent, or Firm* — DLA Piper LLP US

(57) ABSTRACT

A lamp device includes: an optical unit that is provided in a vehicle and irradiates light; a leveling unit configured to adjust an optical axis of the optical unit in a vertical direction; an object detection unit configured to detect an object around the vehicle to generate surrounding environment information; a driving condition determination unit configured to determine a driving condition of the vehicle; and a control unit configured to control the leveling unit, in which the control unit determines a projection surface of the optical unit based on the surrounding environment information and the driving condition and controls a projection distance of light by the leveling unit.

18 Claims, 6 Drawing Sheets

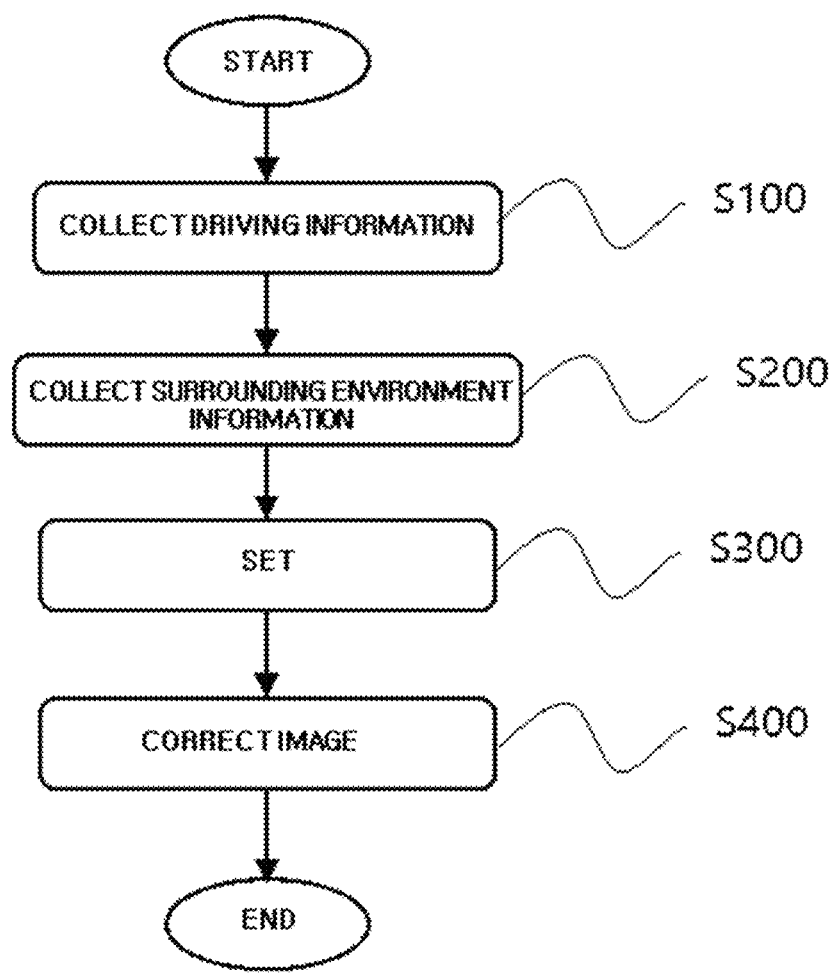

LAMP DEVICE AND CONTROL METHOD THEREOF

CROSS-REFERENCE TO RELATED APPLICATIONS

This application claims priority under 35 U.S.C. § 119 to Korean Patent Application No. 10-2022-0181950, filed on Dec. 22, 2022, in the Korean Intellectual Property Office, the disclosure of which is incorporated herein by reference in its entirety.

TECHNICAL FIELD

The following disclosure relates to a lamp device and a control method thereof, and more particularly, to a lamp device for setting a type of projection surface to which light is irradiated and a projection distance at which light is irradiated based on surrounding environment information and driving conditions of a vehicle, and a control method thereof

BACKGROUND

A vehicle is a means of transportation that moves a user in a desired direction when the user gets into the vehicle. Head lamps, rear combination lamps, direction indicators, interior lights, etc., may be installed as lighting devices in such vehicles, and the lighting devices of the vehicle may perform a function of securing visibility or transmitting signals related to driving information to other vehicles.

Recently, the lighting devices of the vehicle have been developed to perform a function of transmitting information to a driver, a driver of another vehicle, a pedestrian, etc., in addition to a function of securing visibility or transmitting a signal related to driving information. FIG. 1 is a diagram illustrating a vehicle that outputs light for displaying a visual image with a lighting device. For example, as illustrated in FIG. 1, the lighting device of the vehicle may output light displaying a visual image of a snow shape when the vehicle drives on an icy road. As such, the lighting device of the vehicle may provide convenience to drivers, pedestrians, etc., by outputting light for displaying visual images related to various types of information, but is generally configured to provide visual images only based on the drivers.

However, when a target onto which the visual image output from the lighting device of the vehicle is projected or a projection distance at which light is projected changes, the image may be distorted. Therefore, in order to more efficiently utilize the information provided by the visual image output from the lighting device of the vehicle, it is necessary to provide the visual image in consideration of the target onto which the visual image is projected or the projection distance at which the light is projected.

SUMMARY

An embodiment of the present invention is directed to providing a method of operating a lighting device of a vehicle capable of providing various types of information to a target by outputting light for displaying a visual image.

Another embodiment of the present invention is directed to providing a method of operating a lighting device of a vehicle capable of setting a type of projection surface to which light is irradiated based on surrounding environment information and driving conditions of the vehicle.

Still another embodiment of the present invention is directed to providing a method of operating a lighting device of a vehicle capable of setting a projection distance at which light is irradiated by setting a projection angle of light based on surrounding environment information and driving conditions of the vehicle.

Aspects of the present invention are not limited to the above-mentioned aspects. That is, other aspects that are not described may be obviously understood by those skilled in the art from the following specification.

As a technical means for achieving the above technical problem, the present invention discloses a lamp device. In one general aspect, the lamp device includes: an optical unit that is provided in a vehicle and irradiates light; a leveling unit configured to adjust an optical axis of the optical unit in a vertical direction to adjust a projection distance of the light; an object detection unit configured to detect an object around the vehicle to generate surrounding environment information; a driving condition determination unit configured to determine a driving condition of the vehicle; and a control unit configured to control the leveling unit, in which the control unit determines a projection surface of the optical unit based on the surrounding environment information and the driving conditions and determines a projection distance of the optical unit by controlling the leveling unit.

The object detection unit may transmit information on whether there is the object around the vehicle, a type of the object, and a distance between the object and the vehicle to the control unit.

The object may be any one of a wall surface, a front vehicle, or a pedestrian.

The control unit may select a target that is a criterion for recognizing the light of the lamp based on whether there is the object and the type of the object.

The control unit may set the projection surface of the lamp based on whether the vehicle is driving and the type of the object, and set the projection distance based on a distance between the object and the vehicle.

The control unit may set the projection surface as a wall surface when it is determined that the vehicle is in a stopped state and there is a wall surface in front of the vehicle.

The control unit may set the projection surface as a road surface when it is determined that the vehicle is in a stopped state and there is no object in front of the vehicle.

The control unit may set the projection surface as a road surface when it is determined that the vehicle is driving and there is a pedestrian or a vehicle in front of the vehicle.

The lamp device may further include: an image adjusting unit configured to adjust an image projected onto the projection surface from the optical unit based on the surrounding environment information and the driving conditions.

The image adjusting unit may correct a distortion according to the projection distance of the image projected onto the projection surface based on an image according to a pre-stored projection surface and projection distance.

In addition, the present invention discloses a method of controlling a lamp. In another general aspect, the method of controlling a lamp include collecting driving information of a vehicle; collecting information on an object around the vehicle; and setting a projection surface and a projection distance of the lamp of the vehicle based on the driving information and the surrounding environment information.

The projection distance may be determined by adjusting an optical axis of the lamp in a vertical direction.

The collecting of the surrounding environment information may include: determining whether there is an object around the vehicle; determining a type of the object; and determining the distance between the object and the vehicle.

The object may be any one of a wall surface, a front vehicle, or a pedestrian.

The setting may include: determining whether the vehicle is driving; selecting a target that is a criterion for recognizing the light of the lamp based on whether there is the object and the type of the object; and setting the projection surface of the lamp based on whether the vehicle is driving and the type of the object, and setting the projection distance based on a distance between the object and the vehicle.

In the setting, the projection surface may be set as a wall surface when it is determined that the vehicle is in a stopped state and there is a wall surface in front of the vehicle.

In the setting, the projection surface may be set as a road surface when it is determined that the vehicle is in a stopped state and there is no object in front of the vehicle.

In the setting, when it may be determined that the vehicle is driving and there is a pedestrian or a vehicle in front of the vehicle, the projection surface may be set as a road surface.

The method may further include: correcting an image projected onto a projection surface based on the driving information and the surrounding environment information.

In the correcting of the image, a distortion may be corrected according to the projection distance of the image projected onto the projection surface based on an image according to a pre-stored projection surface and projection distance.

Details of other embodiments for solving the problem are included in the description and drawings of the invention.

BRIEF DESCRIPTION OF THE DRAWINGS

FIG. 5 is a diagram illustrating a flow chart of a method of controlling a lamp device according to an embodiment of the present invention.

DETAILED DESCRIPTION OF MAIN ELEMENTS

Figure 1:
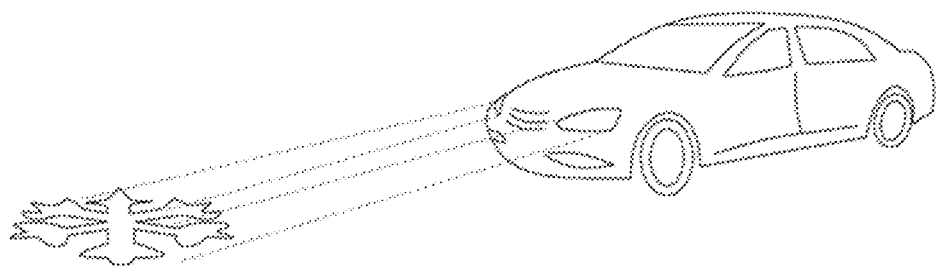
FIG. 1 is a diagram illustrating a vehicle that outputs light for displaying a visual image with a lighting device.

10: Leveling unit
20: Optical unit
30: Control unit
40: Image adjusting unit
50: Object detection unit
60: Driving condition determination unit
100: Lamp device
S100: Collecting driving information
S200: Collecting surrounding environment information
S300: Setting
S400: Correcting image

DETAILED DESCRIPTION OF EMBODIMENTS

Hereinafter, embodiments of the present invention will be described in detail with reference to the accompanying drawings so that those skilled in the art to which the present invention pertains may easily practice. However, the present invention may be implemented in various different forms, and is not limited to the embodiments described herein. In addition, in the drawings, portions unrelated to the description will be omitted to clearly describe the present invention, and similar portions will be denoted by similar reference numerals throughout the specification.

Throughout the present specification, when any one part is referred to as being "connected to" another part, it means that any one part and another part are "directly connected to" each other or are "electrically connected to" each other with still another part interposed therebetween.

Throughout the present specification, when any member is referred to as being positioned "on" other member, it includes not only a case in which any member and another member are in contact with each other, but also a case in which the other member is interposed between any member and another member.

Throughout the present specification, "including" any component will be understood to imply the inclusion of other components rather than the exclusion of other components, unless explicitly described to the contrary. The terms "about," "substantially," and the like used throughout the present specification means figures corresponding to manufacturing and material tolerances specific to the stated meaning and figures close thereto, and are used to prevent unconscionable abusers from unfairly using the disclosure of figures precisely or absolutely described to aid the understanding of the present invention. The term "~step" or "~step of" used throughout the present specification of the present invention does not mean "~step for."

Hereinafter, embodiments of the present invention will be described in detail with reference to the accompanying drawings. However, the present invention is not limited to embodiments herein, but may be implemented in other forms. Same reference numerals denote same constituent elements throughout the specification.

Hereinafter, a lamp device 100 and a control method thereof according to an embodiment of the present invention will be described. First, the lamp device 100 according to an embodiment of the present invention will be described with reference to FIGS. 2 to 5.

Figure 2:
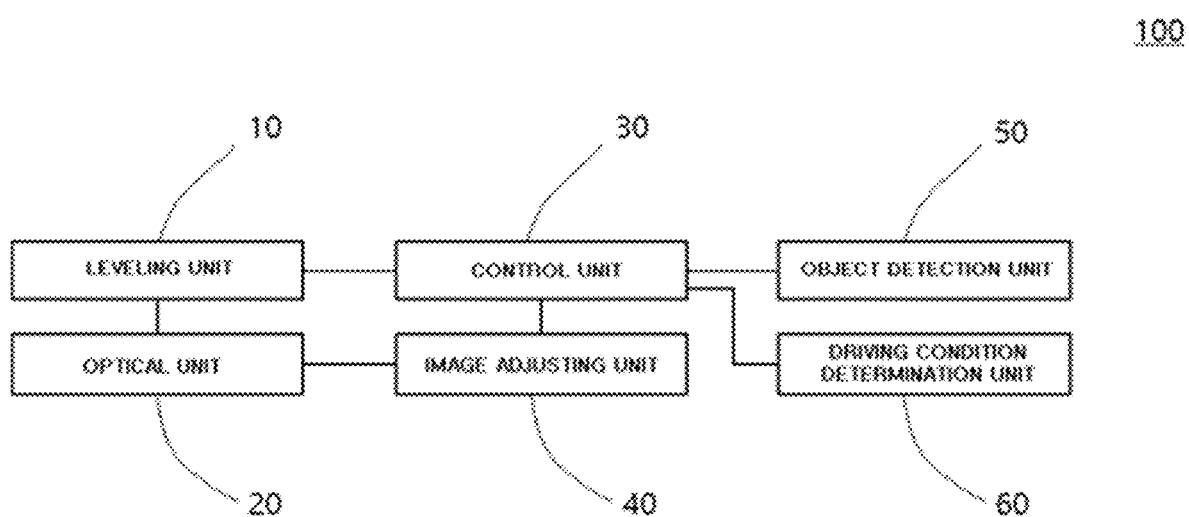
FIG. 2 is a diagram illustrating a configuration of a lamp device according to an embodiment of the present invention.

FIG. 2 is a diagram illustrating a configuration of a lamp device 100 according to an embodiment of the present invention. Referring to FIG. 2, the lamp device 100 of the present invention includes an optical unit 20, a leveling unit 10, an object detection unit 50, a driving condition determination unit 60, a control unit 30, and an image adjusting unit 40.

The optical unit 20 is provided in a vehicle and emits light. In one example, the optical unit 20 may be a headlamp that radiates light toward the front of the vehicle. In one example, the optical unit 20 may be provided to irradiate light or transmit images to a road surface or the front. In addition, the optical unit 20 may be provided to transmit a dynamic image based on a video. The leveling unit 10 adjusts a projection distance of light by adjusting the optical axis of the optical unit 20 in a vertical direction.

The object detection unit 50 detects objects around the vehicle and generates surrounding environment information.

In one example, the surrounding environment information is provided in a type of object, a distance from the object, and the like. In one example, an object may include a wall surface, an object, or a pedestrian. In one example, the object detection unit 50 may be any one of a camera, radar, lidar, and an ultrasonic sensor. Alternatively, the object detection unit may be configured in a combination thereof. In one example, the object detection unit 50 may be provided to face the front of the vehicle.

The driving condition determination unit 60 determines the driving condition of the vehicle. In one example, the driving condition of the vehicle determines whether the vehicle is in a stopped state or in a driving state. In one example, the driving condition determination unit 60 may be provided as a speed measuring device or a speed sensing device.

The control unit 30 controls the leveling unit 10. The control unit 30 receives the surrounding environment information from the object detection unit 50 and the driving condition from the driving condition determination unit 60 to determine the projection surface of the optical unit 20 based on the surrounding environment information and the driving conditions and controls the leveling unit 10. The control unit 30 may be configured as a conventional computer or the like and may store a plurality of image data.

In one example, the projection surface is a wall surface or a road surface. The image adjusting unit 40 adjusts the image irradiated onto the projection surface from the optical unit 20 based on the surrounding environment information and the driving conditions. In one example, the image adjusting unit 40 prevents the image irradiated from the optical unit 20 from being distorted according to the projection surface or the projection distance.

Figure 3:
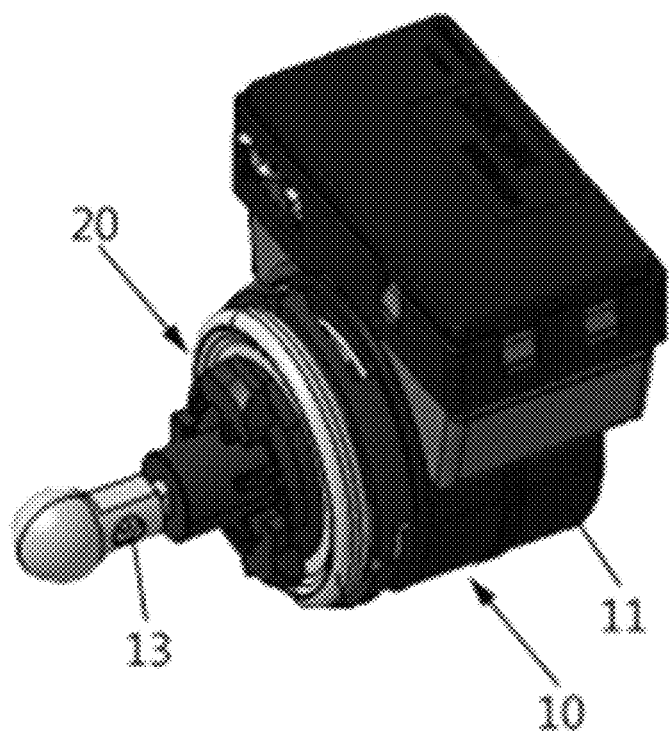
FIG. 3 is a diagram illustrating an appearance of a leveling unit according to an embodiment of the present invention.

Hereinafter, the leveling unit 10 according to the embodiment of the present invention will be described with reference to FIG. 3. FIG. 3 illustrates an appearance of the leveling unit 10 according to the embodiment of the present invention. Referring to FIG. 3, the leveling unit 10 may be provided behind the headlamp. The leveling unit 10 is mounted behind the headlamp and may move the headlamp in the vertical direction. In one example, the leveling unit 10 may be provided as a leveling actuator as illustrated in FIG. 3. In one example, the leveling unit 10 includes a housing 11 that accommodates parts driven by electromagnetic force, a controller 12 that controls the operation of the leveling actuator 10 by receiving an external signal, and in the vertical direction, and a shaft 13 that adjusts an irradiation angle while moving. Accordingly, as the leveling unit 10 moves, the optical axis of the optical unit 20 may be adjusted in the vertical direction.

In one example, the leveling unit 10 may be coupled to a rear case (not illustrated) of the headlamp. In general, the actuator 10 is coupled to the case at the upper end of the housing 11 in the axial direction. Therefore, a fixing bracket 20, which is a separate member for coupling with the headlamp, is disposed on the upper end of the housing 11. The fixing bracket 20 has a groove formed on an outer circumferential surface, and a step is formed on the upper end side. Therefore, the case of the headlamp is seated in the groove and is caught by the step, so the actuator 10 can be coupled to the headlamp.

Figures 4A, 4B, 4C:
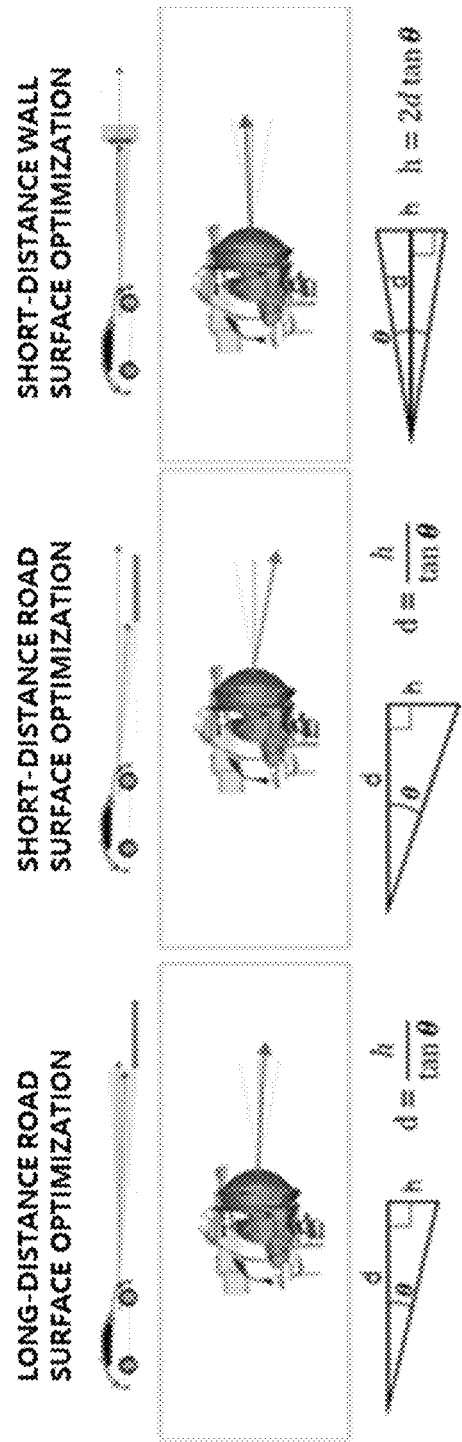
FIGS. 4A-4C diagram illustrate a state in which a leveling unit adjusts a projection distance of light according to an embodiment of the present invention.

FIGS. 4A-4C illustrate a state in which the leveling unit 10 adjusts the projection distance of light according to the embodiment of the present invention. As the leveling unit 10 adjusts the optical axis of the optical unit 20 in the vertical direction, the projection distance of light is adjusted.

First, when the optical unit 20 irradiates light toward the road surface, the distance between the road surface and the headlamp becomes narrower as the angle of the optical axis of the optical unit 20 goes downward with respect to the center line, and accordingly, light is irradiated to the short-distance road surface. It may be represented by the following Equation.

$$d = \frac{h}{\tan\theta}$$

(d=front distance where light is irradiated h=height of headlamp θ=vertical angle of view of headlamp, h is a constant)

Referring to the above Equation and FIGS. 4A and 4B, the height of the headlamp is a fixed constant, and as the vertical angle of view increases, the front distance at which light is irradiated decreases. Therefore, in order to radiate light to a nearby road surface, the leveling unit 10 needs to adjust the angle of the optical axis of the headlamp so that the vertical angle of view of the headlamp increases. On the other hand, in order to radiate light to a far road surface, the leveling unit 10 needs to adjust the angle of the optical axis of the headlamp so that the vertical angle of view of the headlamp decreases.

When the headlamp radiates light toward the wall, the relationship between the distance between the wall surface and the headlamp, the angle of the optical axis of the headlamp pointing up or down with respect to the center line, and the distance at which light is irradiated to the wall surface are as follows. When the headlamp radiates light toward the wall, the angle of the optical axis is maintained horizontally. Accordingly, the size of the projected image is determined by the angle of view of the headlamp and the distance from the wall. Since the angle of the optical axis of the optical unit 20 is horizontally adjusted with respect to the center line, the relationship between the front distance at which light is irradiated to the wall surface and the size of the image is as follows.

$$h = 2d \tan\theta$$

(d=front distance at which light is irradiated h=height of projected image θ=vertical angle of view of headlamp)

Referring to the above Equation and FIG. 4C, when the wall surface is close, the size of the image projected onto the wall surface decreases according to the relationship between the angle of view of the headlamp and the front distance at which the light is irradiated, when the wall surface is far, the size of the image increases.

Hereinafter, a method of controlling a lamp device 100 according to the present invention will be described with reference to FIGS. 5 to 7.

FIG. 5 illustrates a flow chart of a method of controlling a lamp device 100 according to an embodiment of the present invention. In one example, the method of controlling a lamp device 100 includes a driving information collecting step (S100), a surrounding environment information collecting step (S200), a setting step (S300), and an image correcting step (S400).

In the driving information collecting step (S100), the vehicle driving information is collected. For example, the driving condition determination unit 60 determines whether the vehicle is in a stopped state or in a driving state.

In the surrounding environment information collecting step (S200), the object detection unit 50 collects the surrounding environment information by determining whether there is an object around a vehicle, a type of object, and a distance between the vehicle and the object. In one example, the surrounding environment information collecting step (S200) may include a step of determining whether there is an object around a vehicle; a step of determining the type of object; and a step of determining the distance between the object and the vehicle that may be performed sequentially or simultaneously. In one example, the object may be any one of a wall surface, a front vehicle, or a pedestrian.

In the setting step (S300), the control unit 30 receives the previously collected driving information and surrounding environment information, and sets the projection surface and projection distance of the lamp of the vehicle based on the received collected driving information and surrounding environment information. In one example, the setting step (S300) may include: a step of determining whether the vehicle is driving; a step of selecting a target that is a criterion for recognizing the light of the lamp based on whether there is the object and the type of the object; and a step of setting the projection surface of the lamp based on whether the vehicle is driving and the type of the object, and setting the projection distance based on a distance between the object and the vehicle.

Figure 6:
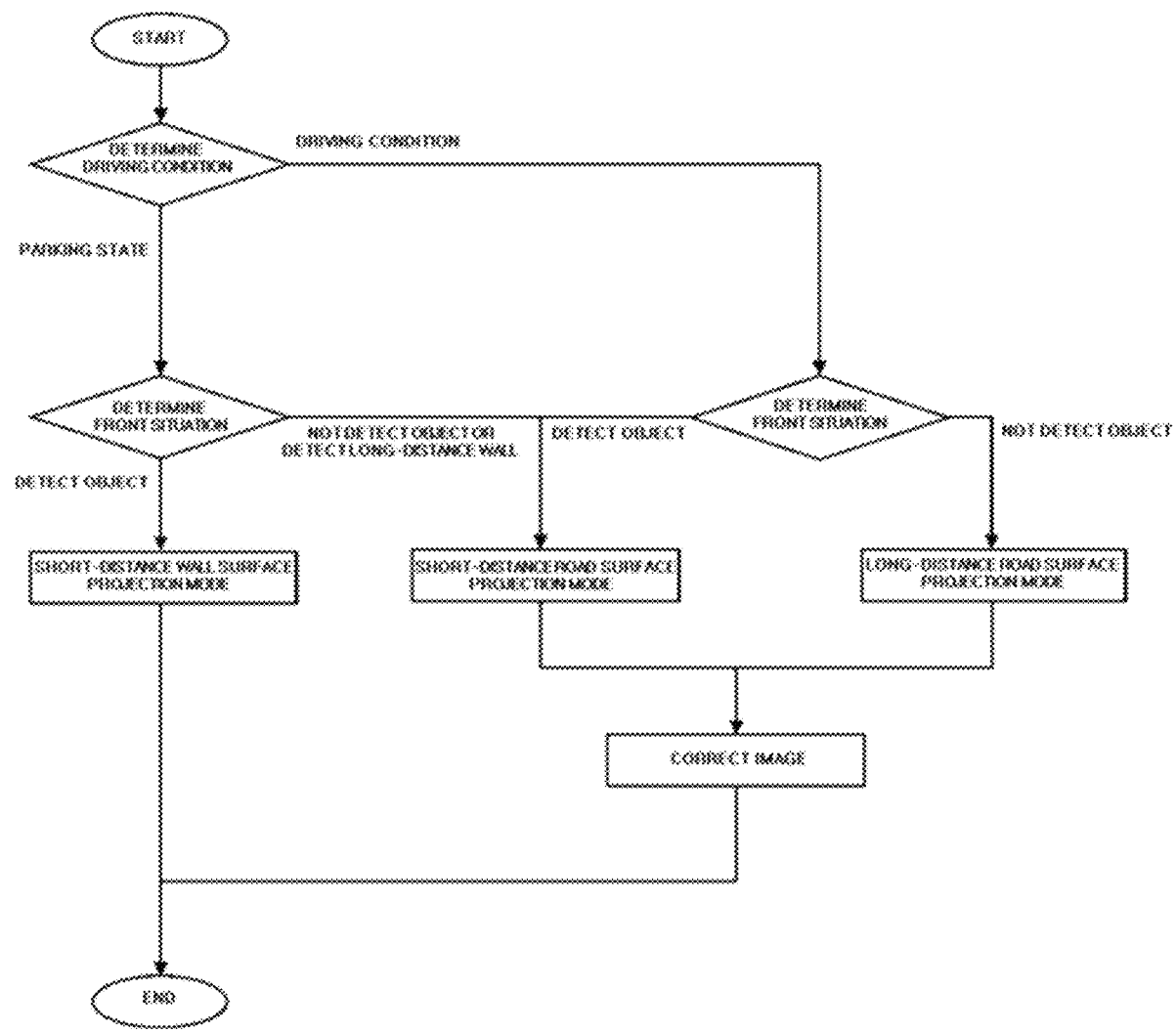
FIG. 6 is a flow chart of a setting step according to an embodiment of the present invention.

FIG. 6 is a flow chart of the setting step (S300) according to an embodiment of the present invention. Referring to FIG. 6, it is first determined whether the vehicle is in the stopped state or the driving state. When the vehicle is stopped and the object is located within a reference distance, the type of object is determined. When the object is recognized as the wall surface, the projection surface is set as the wall surface, a target for recognizing light is set as a driver in the vehicle, and the projection distance is set as the short distance. This is to enable a user in a vehicle to project an image, video, etc., onto the wall surface and enjoy the projected image, video, etc., when the vehicle is stopped.

When the object is recognized as the pedestrian, the projection surface is set as the road surface, a target for recognizing light is set as the pedestrian outside the vehicle, and the projection distance is set as the short distance. It is determined that the pedestrian exists outside, and an image or the like for giving a signal to the pedestrian may be projected.

On the other hand, when the vehicle is in the stopped state and the object is located outside the reference distance, the target for recognizing light is set as the driver in the vehicle or the pedestrian outside the vehicle in some cases, the projection surface is set as the road surface, and the projection distance is set as a long distance. This is to enable the user in the vehicle to project the image, the video, etc., onto the road surface and enjoy the projected image, video, etc., when the vehicle is stopped, or enable the pedestrian outside the vehicle to detect the signal displayed on the road surface. It is determined whether to set the target for recognizing light as the driver or the pedestrian through an additional algorithm or allows the driver to set the target for recognizing light through a button, etc., inside the vehicle.

When the vehicle is the driving condition and the object is located outside the reference distance, the target for recognizing light is set as the driver in the vehicle or the pedestrian outside the vehicle in some cases, the projection surface is set as the road surface, and the projection distance is set as the long distance. This is because there is a low need to radiate light to the wall surface when the vehicle is driving, but there is a high need to assist a driver in driving a vehicle by irradiating light to the road surface or to indicate a signal to the pedestrian. It is determined whether to set the target for recognizing light as the driver or the pedestrian through an additional algorithm or allows the driver to set the target for recognizing light through a button, etc., inside the vehicle.

When it is determined that the vehicle is in the driving condition and there is the object within the reference distance, the type of object is determined and the projection distance is set as the short distance. In one example, the object may be the vehicle or the pedestrian. On the other hand, when it is determined that there is no object in front of the vehicle within the reference distance, the projection distance is set as the long distance. In this case, when there is the object within the set reference distance, it is determined that there is the vehicle in front and the projection distance is set to be close, and when there is no object within the set reference distance, it is determined that there is no vehicle in front and the projection distance is set to be far.

Figure 7:
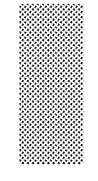
FIG. 7 is a diagram illustrating a process of correcting light or an image projected by an optical unit in an image correction step.

FIG. 7 is a diagram illustrating a process of correcting light or an image projected by the optical unit 20 in the image correction step (S400). Referring to FIG. 7, the distortion of the image appears according to the distance between the optical unit 20 and an area where light is projected. When the distortion is not corrected, as the distance from the headlamp increases, the light spreads, resulting in the image distortion phenomenon that the image spreads. In order to prevent the image distortion phenomenon, the image adjusting unit 40 stores in advance information on the image distortion phenomenon that appears according to the distance between the optical unit 20 and the area where light is projected, and removes the image distortion based on the stored information. In one example, the image adjusting unit 40 is provided to communicate with the control unit 30. The image adjusting unit 40 receives the surrounding environment information and the driving conditions from the control unit 30, and removes the distortion of the image provided by the optical unit 20 by performing perspective and orthogonal correction based on the received surrounding environment information and driving conditions.

According to the present invention, there is an advantage in providing an optimized projection surface by setting the angle of the optical axis in consideration of whether the vehicle is driving and a distance from an object.

In addition, according to the present invention, there is an advantage in improving the visibility of the driver or pedestrian by correcting the distortion phenomenon of the light or images irradiated by the headlamp.

According to the means for solving the problems of the present invention described above, it is possible to provide various types of information to a target by outputting light for displaying a visual image.

In addition, it is possible to improve visibility of a visual image by setting a type of projection surface to which light is irradiated and a projection distance at which light is irradiated, based on information on surrounding environment and driving conditions of the vehicle.

The above description of the present invention is for illustrative purposes, and those skilled in the art to which the present invention pertains will understand that it may be easily modified to other specific forms without changing the technical spirit or essential features of the present invention. Therefore, it should be understood that the above-mentioned embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-described description and all modifications and alterations derived from the claims and their equivalents are included in the scope of the present invention.

What is claimed is:

1. A lamp device, comprising:
   an optical unit to be provided in a vehicle and configured to irradiate light;
   a leveling unit configured to adjust an optical axis of the optical unit in a vertical direction to adjust a projection distance of the light;
   an object detection unit configured to detect an object around the vehicle to generate surrounding environment information;
   a driving condition determination unit configured to determine a driving condition of the vehicle; and
   a control unit configured to control the leveling unit,
   wherein the control unit is configured to determine a projection surface of the optical unit based on the surrounding environment information and the driving condition and determine a projection distance of the optical unit by controlling the leveling unit;
   wherein the control unit is configured to sets the projection surface of the lamp based on whether the vehicle is driving and the type of the object, and set the projection distance based on a distance between the object and the vehicle.

2. The lamp device of claim 1, wherein the object detection unit is configured to transmit information on whether there is the object around the vehicle, a type of the object, and a distance between the object and the vehicle to the control unit.

3. The lamp device of claim 2, wherein the object is any one of a wall surface, a front vehicle, or a pedestrian.

4. The lamp device of claim 1, wherein the control unit is configured to select a target that is a criterion for recognizing the light of the lamp based on whether there is the object and the type of the object.

5. The lamp device of claim 1, wherein the control unit is configured to sets the projection surface as a wall surface when it is determined that the vehicle is in a stopped state and there is a wall surface in front of the vehicle.

6. The lamp device of claim 1, wherein the control unit is configured to sets the projection surface as a road surface when it is determined that the vehicle is in a stopped state and there is no object in front of the vehicle.

7. The lamp device of claim 1, wherein the control unit is configured to sets the projection surface as a road surface when it is determined that the vehicle is driving and there is a pedestrian or a vehicle in front of the vehicle.

8. The lamp device of claim 1, further comprising:
   an image adjusting unit configured to adjust an image projected onto the projection surface from the optical unit based on the surrounding environment information and the driving condition.

9. The lamp device of claim 8, wherein the image adjusting unit is configured to corrects a distortion according to the projection distance of the image projected onto the projection surface based on an image according to a pre-stored projection surface and projection distance.

10. A method of controlling a lamp, comprising:
    collecting driving information of a vehicle;
    collecting surrounding environment information on an object around the vehicle; and
    setting a projection surface and a projection distance of the lamp of the vehicle based on the driving information and the surrounding environment information,
    wherein the setting includes:
    determining whether the vehicle is driving;
    selecting a target that is a criterion for recognizing light of the lamp based on whether there is the object and the type of the object; and
    setting the projection surface of the lamp based on whether the vehicle is driving and the type of the object, and setting the projection distance based on a distance between the object and the vehicle.

11. The method of claim 10, wherein the projection distance is determined by adjusting an optical axis of the lamp in a vertical direction.

12. The method of claim 10, wherein the collecting of the surrounding environment information includes:
    determining whether there is an object around the vehicle;
    determining a type of the object; and
    determining the distance between the object and the vehicle.

13. The method of claim 12, wherein the object is any one of a wall surface, a front vehicle, or a pedestrian.

14. The method of claim 10, wherein the projection surface is set as a wall surface when it is determined that the vehicle is in a stopped state and there is a wall surface in front of the vehicle.

15. The method of claim 10, wherein the projection surface is set as a road surface when it is determined that the vehicle is in a stopped state and there is no object in front of the vehicle.

16. The method of claim 10, wherein when it is determined that the vehicle is driving and there is a pedestrian or a vehicle in front of the vehicle, the projection surface is set as a road surface.

17. The method of claim 10, further comprising:
    correcting an image projected onto a projection surface based on the driving information and the surrounding environment information.

18. The method of claim 17, wherein in the correcting of the image, a distortion is corrected according to the projection distance of the image projected onto the projection surface based on an image according to a pre-stored projection surface and projection distance.

* * * * *